United States Patent
Kasai et al.

(10) Patent No.: US 6,191,395 B1
(45) Date of Patent: Feb. 20, 2001

(54) HEATING ROLLER

(75) Inventors: Toru Kasai; Akiyoshi Sugawara, both of Tokyo (JP)

(73) Assignee: Jamco Corporation, Tokyo (JP)

( * ) Notice: Under 35 U.S.C. 154(b), the term of this patent shall be extended for 0 days.

(21) Appl. No.: 09/399,224

(22) Filed: Sep. 20, 1999

(30) Foreign Application Priority Data

Sep. 22, 1998 (JP) .................................................. 10-268108

(51) Int. Cl.$^7$ ...................................................... B21B 27/06
(52) U.S. Cl. .............................. 219/469; 492/50; 492/51; 492/52
(58) Field of Search .................................. 399/328–338, 399/69; 219/216, 469–471; 118/60; 432/60, 228; 492/46, 29, 50–52

(56) References Cited

U.S. PATENT DOCUMENTS

| | | | |
|---|---|---|---|
| 3,649,810 | * | 3/1972 | Tsuboi et al. .......................... 219/216 |
| 5,655,444 | * | 8/1997 | Kayser et al. ......................... 100/334 |
| 6,108,906 | * | 8/2000 | Fujita et al. ...................... 29/895.211 |

* cited by examiner

*Primary Examiner*—Teresa Walberg
*Assistant Examiner*—Shawntina L. Fuqua
(74) *Attorney, Agent, or Firm*—Armstrong, Westerman, Hattori, McLeland & Naughton

(57) ABSTRACT

A heating roller 10 comprises a surface layer 157 formed of a prepreg material including carbon fibers having a high tensile strength and a high elastic modulus, and a heating unit 153 mounted in the inner area of the surface layer and communicated to a power supply unit 30 formed of a prepreg material including carbon fibers having a high electric resistance. A metal material working as an electrode 20 communicated to the power supply unit 30 and the heating unit 153 is mounted to both ends of the heating roller 10. The electric resistance of the heating unit 153 is adjusted either by changing the thickness (number of laminated layers) of the prepreg material including carbon fibers, or by adjusting the mounting angle of the carbon fibers inside a prepreg material being laminated and the angle of the carbon fibers inside another prepreg material being laminated. Moreover, the carbon fibers of the heating unit 153 are uniformly mounted in the circumferential direction of the roller, so as to obtain a uniform surface temperature.

5 Claims, 5 Drawing Sheets

HEATING ROLLER

BACKGROUND OF THE INVENTION

1. Field of the Invention

The present invention relates to a roller for heat-treating film, cloth, paper and the like.

2. Description of the Prior Art

Conventional heating rollers such as a calendar roller, a laminating roller, a fixing roller and the like utilize a heater embedded inside a metallic pipe in order to heat the cuter pipe indirectly. However, the conventional method had a drawback in that the surface temperature of the outer pipe tended to be uneven, which was not suitable for heat-treating film and the like.

Therefore, in order to improve the uniformity of the heat distribution on the surface of the roller, a method such as circulating a heat medium (liquid and the like ) inside the pie, or a method combining the heat circulation method and an induction heating method is performed. However, the ancillary devices for performing these methods were complex, the weight of the pipe was increased, and the heating roller as a whole including the driving system became very expensive.

SUMMARY OF THE INVENTION

Therefore, the present invention aims at providing an inexpensive and light-weight heating roller with a uniform surface temperature.

The heating roller according to the present invention comprises, as a basic structure, a surface layer formed of a prepreg material including carbon fiber having a high tensile strength and a high elastic modulus, and a heating unit mounted in the interior of said surface layer and communicated to a power supply unit formed of a prepreg material including carbon fiber having a high electric resistance.

Moreover, a metal material acting as an electrode communicated to the power supply unit and the heating unit is mounted to both end portions of the heating roller.

Further, the electric resistance of the heating unit may either be adjusted by varying the thickness (laminated number) of the prepreg material including the carbon fiber, or may be adjusted by the angle of the mounted carbon fibers in each of the laminated prepreg material.

The carbon fiber of the heating unit is arranged uniformly in the circumferential direction of the roller, so as to realize a uniform surface temperature.

PREFERRED EMBODIMENT OF THE INVENTION

The embodiments of the heating roller according to the present invention will now be explained with reference to the accompanied drawings.

(Embodiment 1)

Figure 1:
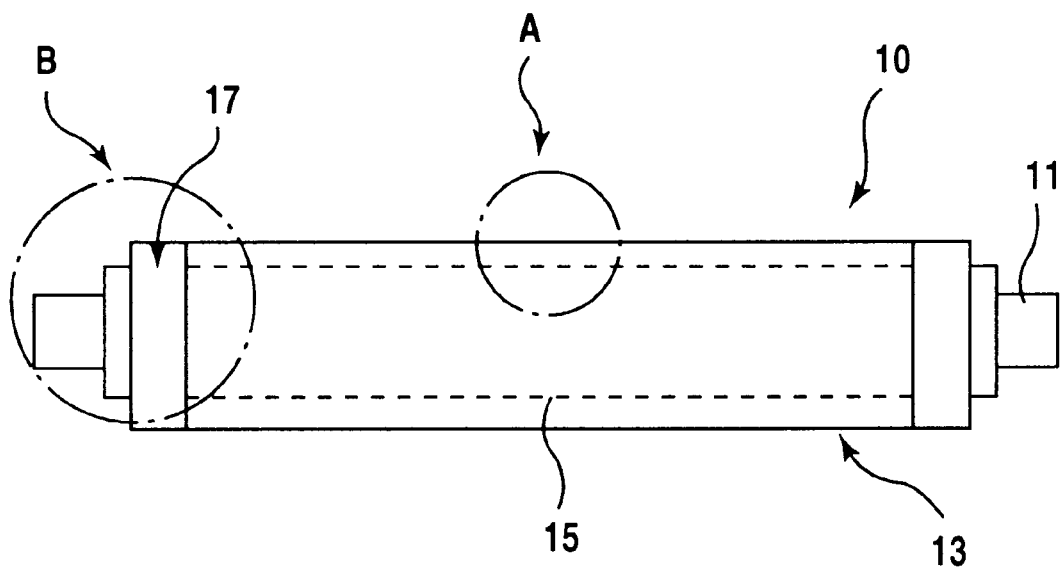
FIG. 1 is a plan view of the heating roller according to the present invention.
Figure 2:
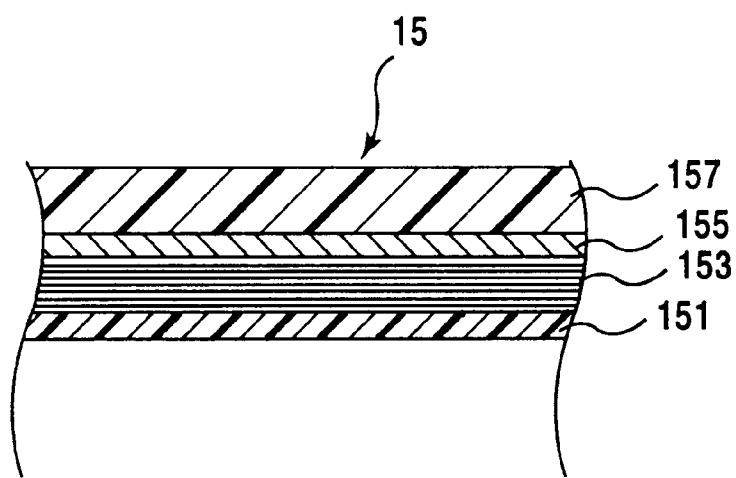
FIG. 2 is a cross-sectional view taken at portion A of FIG. 1.
Figure 3:
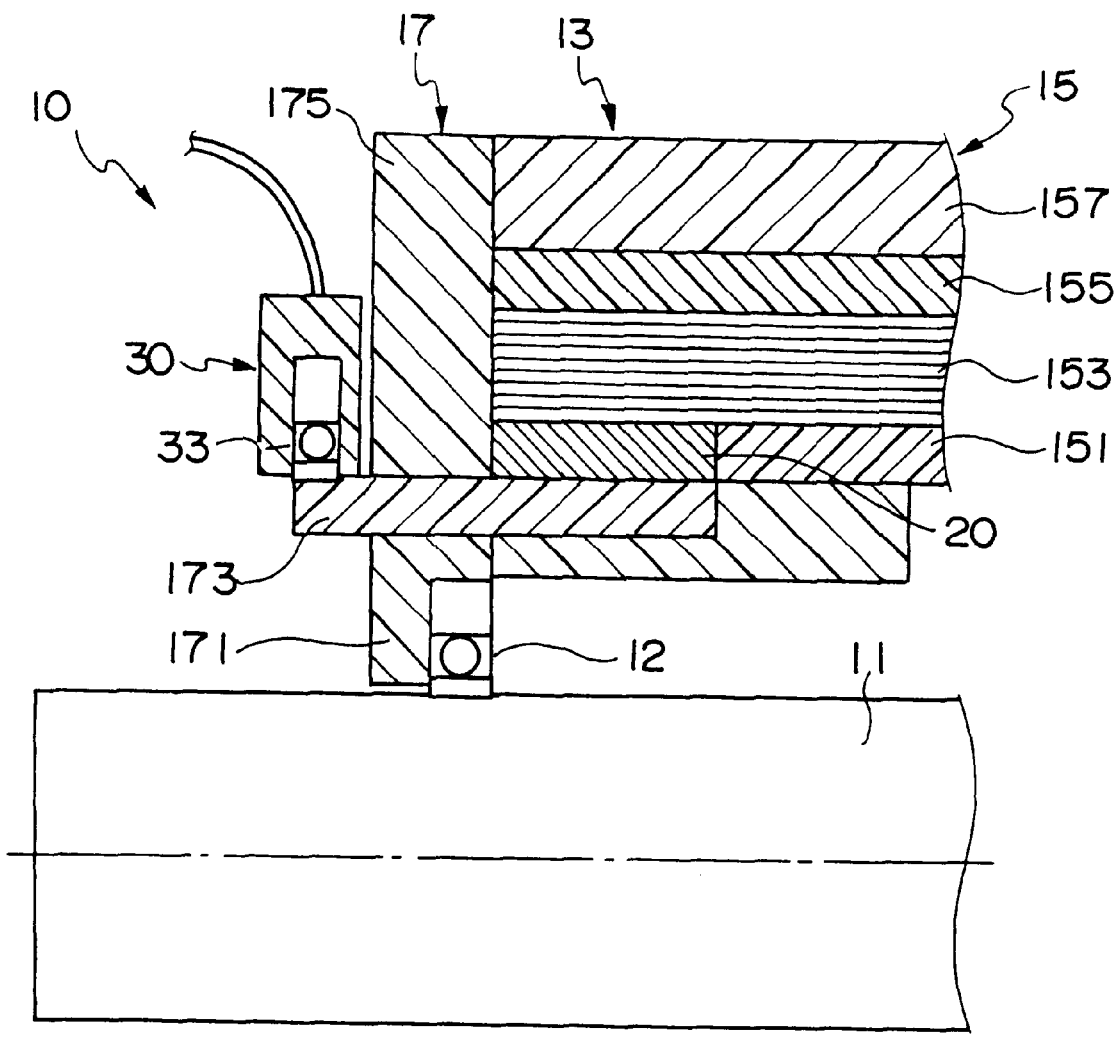
FIG. 3 is an explanatory view showing the structure of portion B of FIG. 1.
Figure 4:
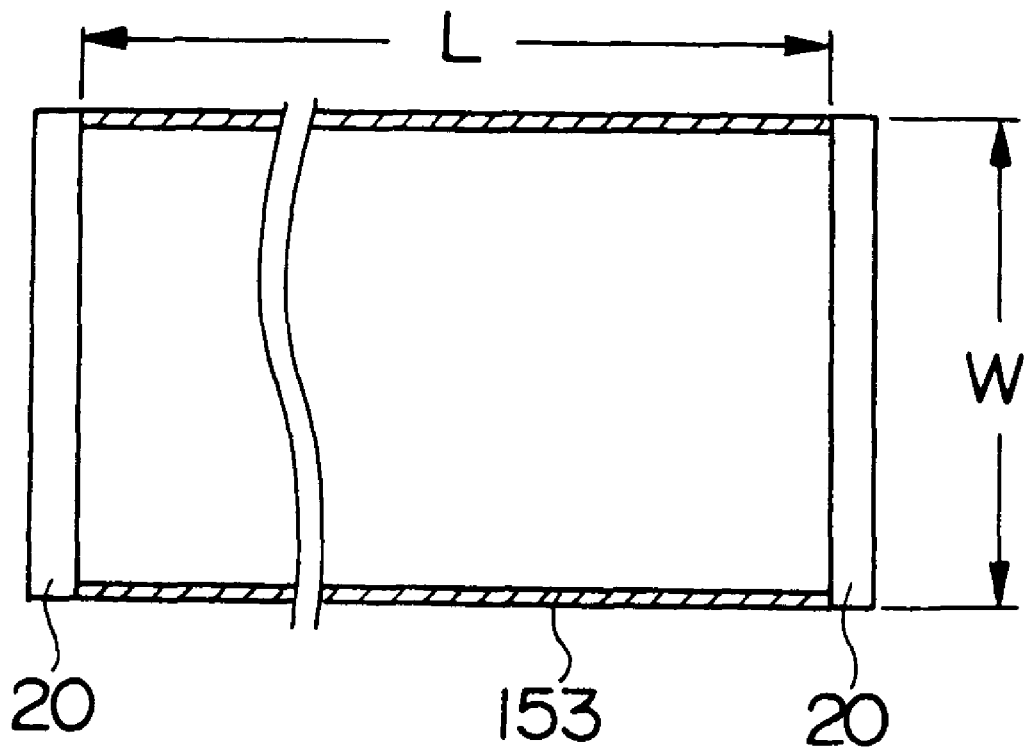
FIG. 4 is an explanatory view of the heating layer.

FIG. 1 is a plan view of a heating roller 10, FIG. 2 is a cross-sectional view taken at portion A of FIG. 1, and FIG. 3 is a cross-sectional view taken at portion B of FIG. 1.

The heat roller 10 comprises a center shaft 11, a heat pipe 13 mounted around the center shaft 11 and a power supply unit 30.

The heat pipe 13 is mounted rotatably to the center shaft 11 by a bearing 12.

The heat pipe 13 is formed of a cylindrical pipe body 15, and a mounting unit 17 for mounting the pipe body 15 to the center shaft 11.

According to the present embodiment, the pipe body 15 of the heat pipe 13 is a pipe having an inner diameter size $\gamma$ of 96 $\phi$, and a circumferential length W of 302 mm. A first insulating layer 151 formed of a glass cloth prepreg is mounted as the inner first layer. On the upper surface of the first insulating layer 151 is laminated a heating layer 153 formed of a carbon prepreg material having a high resistance.

The carbon prepreg material constituting the heating layer 153 includes carbon fibers having a high electric resistance which are placed uniformly in the same direction.

Ten layers of carbon prepreg material are laminated on a second insulating layer 155 formed to the upper surface of the heating layer 153.

On both ends in the mounting area of the first insulating layer 151 are mounted electrode layers 20.

The electrode layer 20 formed of a metal material is embedded to the first insulating layer 151, with one surface contacting the heating layer 153.

Each prepreg is impregnated with a thermosetting resin having a high heat resistance, such as an epoxy or a polyimide. After laminating each prepreg to a mandrel, a heat-shrinkable tape such as a polyester tape is wound around the outer peripheral of the pipe-shaped laminated body, which is subsequently heat-cured at a temperature of 180° C. for two hours, thereby forming the pipe body 15.

The characteristics of the carbon fiber are shown in the following chart 1.

CHART 1

| characteristics | (1) high resistance carbon fiber | (2) high strength carbon fiber |
| --- | --- | --- |
| tensile strength | 65 kg/mm$^2$ | 350 kg/mm$^2$ |
| tensile elastic modulus | 8400 kg/mm$^2$ | 24000 kg/mm$^2$ |
| resistibility | 740 $\mu \Omega$ M | 18 $\mu \Omega$ M |

As shown in the chart, the carbon fiber having a high electric resistance shown in (1) has a resistibility which is over 40 times the resistibility of the common carbon fiber shown in (2)

The common carbon fiber shown in (2) has a low resistiblity, but has a high strength (tensile strength, tensile elasticity), and when comparing the two fibers, the carbon fiber shown in (2) has a tensile strength which is over five times that of the carbon fiber shown in (1), and a tensile elasticity of 3.5 times that of (1).

Next, the characteristics of the prepreg materials formed by mounting each carbon fiber having the above-mentioned characteristics in the same direction in parallel and heat-curing the same are compared.

CHART 2

| characteristics | high-resistance prepreg | high-strength prepreg |
|---|---|---|
| tensile elastic modulus | 4000 kg/mm² | 12500 kg/mm² |
| thickness per layer | 0.1 mm | 0.15 mm |
| resistance per layer① | 16.9 L/W Ω | 0.4 L/W Ω |
| specific gravity | 1.53 | 1.56 |

The prepreg material including the high-strength carbon fiber has a tensile elastic modulus which is approximately three times that of the prepreg material including the high-resistance carbon fiber. Further, the prepreg material comprising the high-resistance carbon fiber has an electric resistance which is over four times that of the prepreg material comprising a normal carbon fiber.

Therefore, the pipe body 15 of the heating roller 10 according to the present invention includes a heating layer 53 formed of a prepreg material comprising a high electric resistance, and reinforcing said layer 153 by forming a surface layer 157 of a prepreg material having a high elasticity and high strength.

The pipe body 15 formed as explained above is mounted to a mounting unit 17.

The mounting unit 17 comprises a supporting unit 171 connected to a bearing 12 of the center shaft 11 and supporting the pipe body 15, a metal plate 173 mounted to the supporting unit 171 and electrically connecting the electrode 20 and the power supply unit 30, and a cover 175 covering the end rim portion of the pipe body 15.

The power supply unit 30 and the metal plate 173 are connected through a bearing 33, and the heat pipe 13 is mounted rotatably against the center shaft 11 and the power supply unit 30 through bearings 12 and 33.

The heating roller 10 having the above-explained structure is formed so that the heating layer 153 having a high resistance will generate heat when voltage is impressed to the electrode 20 from the power supply unit 30.

In such case, the electric resistance of the heating layer 153 between the electrodes 20 is expressed as follows.

16.9×1000/302=56Ω(L=1000, W=302)

When the supply voltage of the power supply unit 30 is set to 100 V, then the power consumed by the heating layer 153 having a resistance of 56Ω will be approximately 180 W in power generation.

Moreover, the weight of the pipe body 13 formed as above is approximately 990 g per 1 m. If a pipe (outer diameter= 100 φ, inner diameter=97.56 φ) having the same rigidity is made of iron, the weight will be 2.95 kg per 1 m.

In other words, the pipe body according to the present invention is approximately lighter in weight by 64% compared to the pipe made of iron.

When power is fed from the power supply unit 30 to the heat pipe 13 according to the present invention, the power is supplied to the electrode 20 through the metal plate 173, which leads to heating of the heating layer 153 having a high electric resistance. The heat generated from the heating layer 153 heats the surface layer 157 through heat conduction.

For example, when the supply voltage of the power supply unit 30 is set to 100 V, the temperature of the surface layer 157 became 180° C.

As explained, the heating roller 10 according to the present embodiment utilizes a synthetic resin material formed by heat-curing a carbon fiber having a high resistance as the heating layer 153. Therefore, a reliable and uniform heating may be performed. Moreover, the heating roller 10 is light-weight and may be operated easily.

(Embodiment 2)

The present embodiment is characterized in that the laminated structure of the heating layer is changed.

Figure 5:
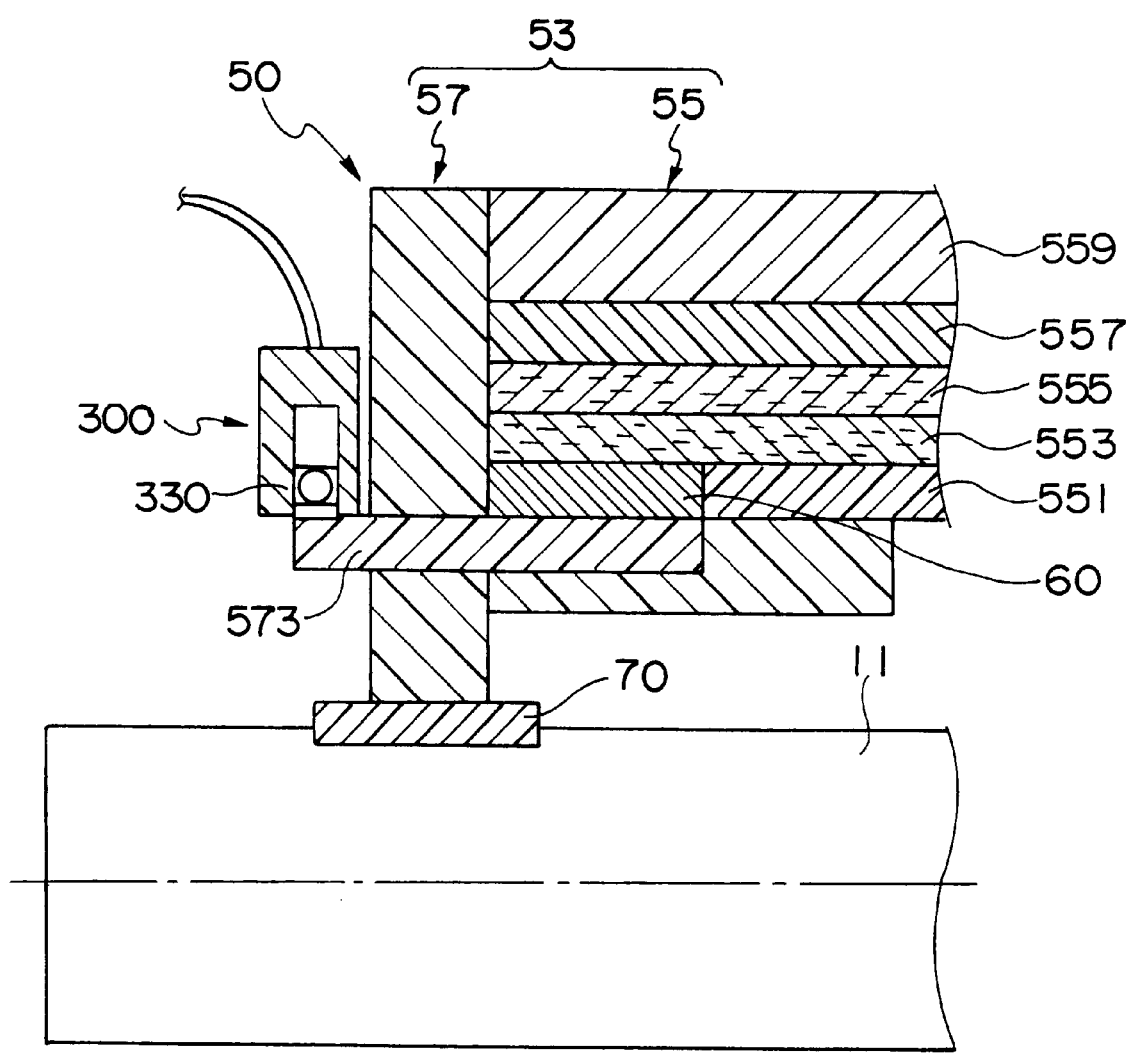
FIG. 5 is an explanatory view showing the main portion of the heating roller according to embodiment 2 of the present invention.
Figure 6:
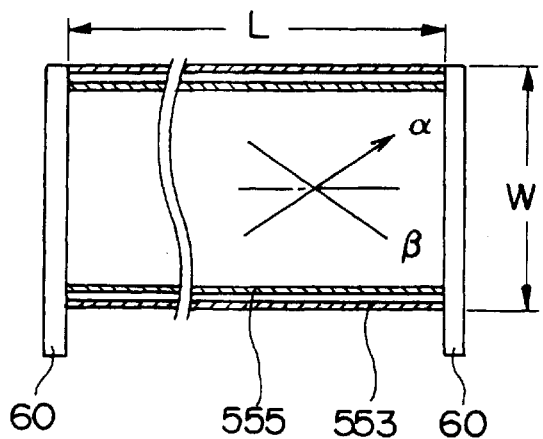
FIG. 6 is an explanatory view showing the heating layer according to embodiment 2 of the present invention.

FIG. 5 is a structural cross-sectional view of the heating roller according to the present embodiment, and FIG. 6 is an explanatory view showing the laminated state of the heating layer.

A heating roller 50 comprises a heat pipe 53 including a cylindrical pipe body 55 and a mounting unit 57 for mounting the pipe body 55 to a center shaft 11 and a power supply unit 300 for supplying power to the heat pipe 53.

The heat pipe 53 is mounted integrally to the center shaft 11 through a key 70. The heat pipe 53 works as a driving roller driven by a motor and the like.

The pipe body 55 of the heat pipe 53 is formed for example as a pipe having an inner diameter size γ of 96 φ, and a circumferential length W of 302 mm. The heating layer is sandwiched by an inner first layer 551 formed of a glass cloth prepreg and an insulating second layer 557 formed of a similar material as the inner first layer 551.

The heating layer is formed by laminating a first heating layer 553 comprising a carbon prepreg material having a high resistance, and a second heating layer 555 comprising a carbon prepreg material having a high resistance.

The first heating layer 553 and the second heating layer 555 are laminated so that the carbon fibers mounted in parallel within one layer are oriented in a direction different than the fibers within the other layer.

That is, the first heating layer 553 is laminated so that the parallel orientation of the carbon fiber is set to θ=+60° as shown by arrow α, and the second heating layer 555 is laminated so that the parallel orientation of the carbon fiber is set to θ=−60° as shown by arrow β (refer to FIG. 6).

Figure 7:
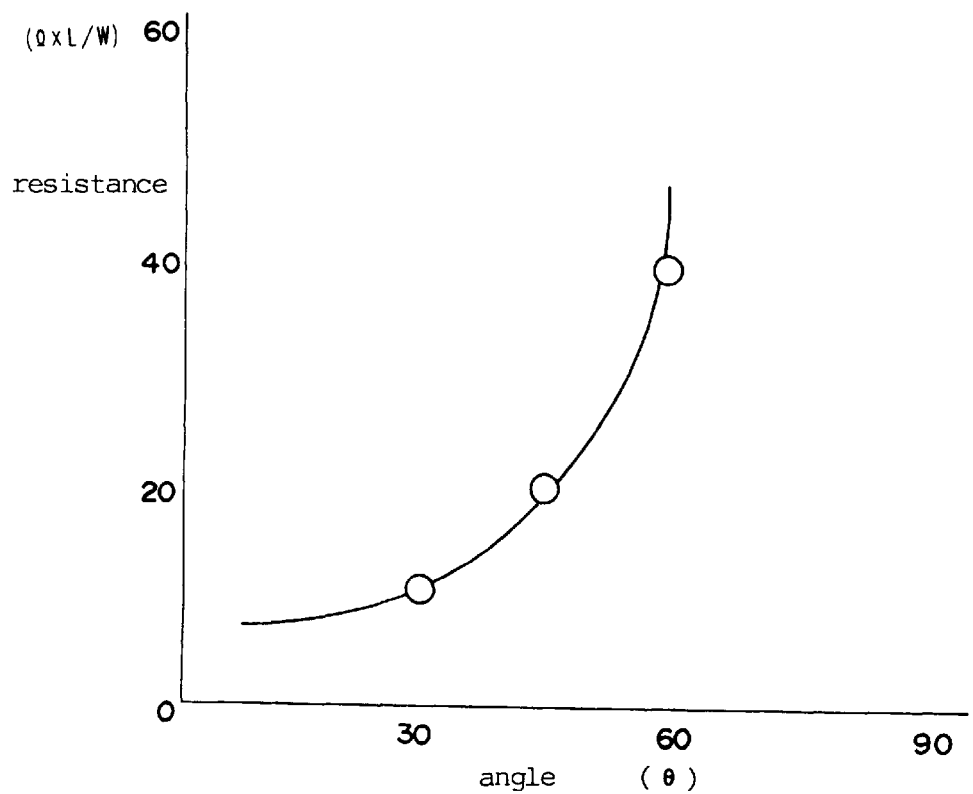
FIG. 7 is a graph showing the change in resistance of the heating layers according to the relative laminated angle of each of the heating layers.

Then, the change in the electric resistance according to the angle of the carbon fibers in the carbon prepreg materials being laminated as above is observed (refer to FIG. 7).

According to the graph of FIG. 7, when the angle (θ) between the carbon fibers mounted in the first layer of the carbon fiber prepreg material and the carbon fibers mounted in the second layer of the prepreg material is increased, the resistance of the laminated body will increase. When the angle θ in the present embodiment is set to 60 degrees, the resistance of the laminated body is observed to be 40.

Moreover, a prepreg material having high strength is laminated on top of the second heating layer 555 through a second insulating layer 557, thereby forming a surface layer 559. Similarly as the first embodiment, a heat-shrinkable tape is wound around the outer peripheral of the laminated pipe, which is heat-cured for two hours under a temperature of 180° C., so as to form the pipe body 55.

Similarly in the heating roller 50, electrode layers 60 are mounted to both end portions of the first insulating layer 551. When the length L between the electrodes is 1000 mm and the length W of the electrodes is 302 mm, the resistance of the heating layers 553 and 555 between the electrodes 60 may be calculated by referring to the graph shown in FIG. 7. When the lamination angle θ between the first heating layer 553 and the second heating layer 555 is set to 60 degrees, the resistance may be shown as follows:

40×1000/302=132Ω

When the voltage supplied to the power supply unit 300 of the heating roller 50 is set to 100 V, the power supplied through the metal plate 573 and consumed by the heating layer between the electrodes 60 is approximately 76 W.

In the present embodiment, an example is shown where the heating layer comprises a two-layer structure of high-resistance carbon fiber prepreg materials with the carbon fibers in the two layers oriented to have a laminated angle of 60 degrees. However, an optional resistance of the heating layer between the electrodes may be obtained by adjusting the laminated angle of the carbon fibers, by adjusting the layer thickness of the high-resistance carbon fiber prepreg material, or by changing the number of layers being laminated.

Moreover, the heating roller may be set to have an optional strength or rigidity by varying the thickness of the prepreg material of the surface layer having high elasticity and high strength.

The heating roller according to the present invention includes utilizing carbon fibers having high resistance laminated to have a predetermined thickness and angle as the heat generating body, so as to simplify the structure of the heat generating unit and to reduce the weight of the roller.

Moreover, the present invention utilizes carbon fiber having high strength and high elastic modulus as the surface reinforcing material, thereby improving the strength and rigidity of the heating roller.

We claim:

1. A heating roller comprising a surface layer and a heating unit mounted in the interior of said surface layer and communicated to a power supply unit; wherein said surface layer is formed of a prepreg material including carbon fibers having a high tensile strength and a high elastic modulus; and said heating unit is formed of a prepreg material including carbon fibers having a high electric resistance.

2. A heating roller according to claim 1, wherein a metal material acting as an electrode communicated to said power supply unit and said heating unit is mounted to both end portions of said heating roller.

3. A heating roller according to claim 1, wherein the electric resistance of said heating unit is adjusted by the thickness of said prepreg material including said carbon fibers.

4. A heating roller according to any one of claims 1 through 3, wherein the thickness of said prepreg material of the heating unit is adjusted by laminating prepreg materials, and the electric resistance of said heating unit is adjusted by the angle of the carbon fibers included in a laminated prepreg material and the angle of the carbon fibers included in another laminated prepreg material.

5. A heating roller according to any one of claims 1 through 3, wherein said carbon fibers of the heating unit having a high electric resistance is arranged uniformly in the circumferential direction of said roller.

* * * * *